United States Patent [19]

Schechter

[11] 3,839,733

[45] Oct. 1, 1974

[54] SYNCHRONIZING SYSTEM FOR AUTOMATIC SLIDE PROJECTORS AND MONOPHONIC MAGNETIC TAPE RECORDERS

[76] Inventor: Arthur H. Schechter, 15735 Garacol Dr., Hacienda Heights, Calif. 91745

[22] Filed: Sept. 1, 1972

[21] Appl. No.: 285,914

[52] U.S. Cl. .................................................. 360/80

[51] Int. Cl. ........................ G11b 27/22, G03b 31/00

[58] Field of Search ............. 179/100.2 S, 100.1 PS; 360/80

[56] References Cited

UNITED STATES PATENTS

| | | | |
|---|---|---|---|
| 2,141,203 | 12/1938 | Abbott | 179/100.2 S |
| 2,787,669 | 4/1957 | Flan | 179/100.2 S |
| 2,811,588 | 10/1957 | Julie | 179/100.2 S |
| 3,200,206 | 8/1965 | Johnson | 179/100.2 S |
| 3,227,814 | 1/1966 | Ferris | 179/100.2 S |

*Primary Examiner*—Stuart N. Hecker

*Attorney, Agent, or Firm*—Norman L. Chalfin

[57] ABSTRACT

A unitary signal processing and reproducing device is disclosed with which a slide projector of the automatic tripping type can be actuated from a trip signal recorded on a monophonic magnetic tape medium synchronously on a common track with the accompanying sound commentary describing the slides to be projected, and any sound effects which may be used. The tripping signals are not heard during playback. The system includes both a novel means for recording the tripping signal on the same track with the commentary and for reproducing the recorded commentary sound signals separating and applying the tripping signals to the projector. The separating of the latter from the former being accomplished by a novel circuit employing a transformer as a combination high-pass and low-pass filter.

9 Claims, 2 Drawing Figures

SYNCHRONIZING SYSTEM FOR AUTOMATIC SLIDE PROJECTORS AND MONOPHONIC MAGNETIC TAPE RECORDERS

BACKGROUND OF THE INVENTION

1. Field of the Invention

A great many inexpensive magnetic tape casette recording machines are being sold currently. Persons who also have automatic slide projectors are desirous of programming their slides with an associated commentary synchronously. Such systems are useful for schools and to industry training and sales staffs as audio-visual programming tools. This invention relates to a system by which synchronous slide and commentary programming can be accomplished efficiently and inexpensively.

2. The Prior Art

In the prior art related to this invention there have been disclosed a number of devices employing stereophonic tape recorders wherein the trip tone and commentary are recorded on separate tracks. Other devices employ signals recorded on a common track. These employ complex cross-over networks to separate the commentary sound and trip-tone signals both for recording and for playback. Some of these latter systems employ a trip tone higher in frequency than the normal audible response of tape recording machines. Appropriate discrete filters are used to separate the sound or voice signals from trip-tone signals. Other common-track systems employ a low frequency trip-tone signal selected to occur below a normal person's range of hearing or below the usual audible response capability of the recording equipment to be used. These systems sometimes tend to reproduce the unwanted signals in a disturbing fashion so that in the one case an annoying screech accompanies each slide change or, similarly, a disturbing growl is heard.

THE PRESENT INVENTION

In the present invention there is disclosed a combination of means by which a monophonic magnetic tape recorder of the casette type, or reel-to-reel type, can be used for synchronously recording the control tones for tripping the slide change operation of a slide projector, along with the accompanying sound. During the recording process a signal derived from the slide projector change mechanism is substituted for the voice signal at the desired instant of slide change. This is a 60 Hertz a-c signal and lasts a predetermined interval by virtue of the circuit used in the invention. For playback a separate loudspeaker is employed in the invention to replace that normally present in the recording machine. The replacement does not necessitate any modification of the recorder. A transformer which couples this external loudspeaker to the audio circuits of the tape recording machine for playback includes a circuit means which combine with the transformer windings to discriminate between the tone signal for tripping the projector and the voice signals, transferring the voice signals to the substitute loudspeaker and preventing their entering the tripping circuits, while passing the tripping signals only to the tripping circuits.

The entire assembly is connected to the magnetic tape recording machine via cables which are coupled to the input and output jacks of the recorder in their normal use configurations. This makes it unnecessary to modify the tape recording machine as is the case when using some prior art devices.

The novel features of this invention will be more fully spelled out in the specification which follows. They are illustrated in the accompanying diagrams and drawings showing preferred embodiments of the invention. These should not be construed as limiting the invention to the illustrated embodiments since those skilled in the arts appertaining to the invention may conceive of other forms thereof in the light of the teachings herein within the ambit of the appended claims.

BRIEF DESCRIPTIONS OF THE DRAWINGS

FIG. 1 is a semi-schematic perspective drawing showing the invention in its relation to the exemplary use thereof with a casette type magnetic tape recording machine and an exemplary automatic slide projector; and FIG. 2 is a schematic circuit diagram of the invention showing the components of the invention device and interconnections with the article shown in FIG. 1.

DESCRIPTION OF THE PREFERRED EMBODIMENT

Figure 1:
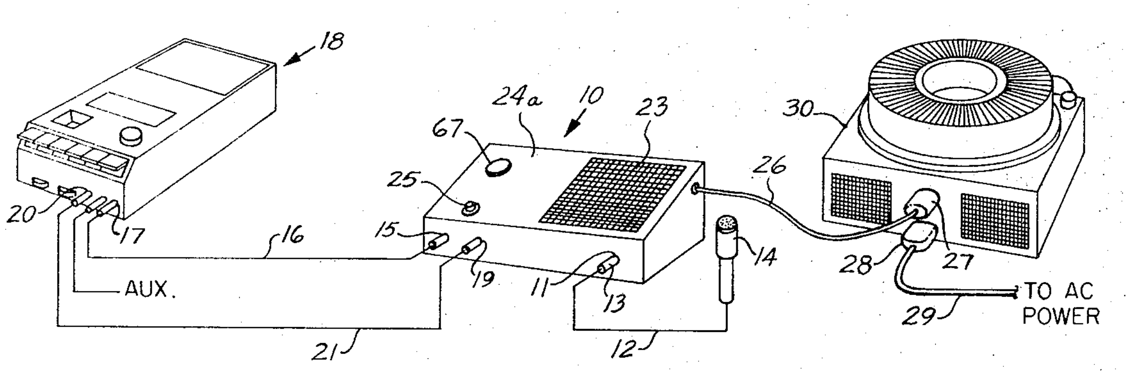

In FIG. 1 there is shown an assembly 10 incorporating the mechanisms and components of this invention as connected to a recording machine 18 and an automatically tripping projector 30. The configuration of the assembly 10 may be in any suitable form in which the components may be put together. The form shown at 10 includes a sloping front panel box of known type which is generally available at electronics and radio parts shops. A loudspeaker 22, not shown in FIG. 1, is positioned behind the screen 23 in the assembly 10 and attached to its sloping panel 24*a*. An input jack 11 is provided in assembly 10 to receive a cable and plug 12, 13 connected with a microphone or other sound signal source 14. Another input jack 15 is shown to receive a connector plug and cord 16 from the output (external speaker) jack 17 of a tape recorder 18. The recorder 18 is shown here as a well-known cassette-type of machine but may be any monophonic magnetic tape recording machine, with monitoring capability in the record mode, currently available on the commercial market. An output jack 19 on the invention cabinet 10 is employed to provide a connection from the output of the device 10 to the microphone input 20 of the tape recording machine 18 via a cable 21. A cable 26 is connected from the new device 10 to the trip input terminals of projector 30 at 27.

The system interconnected as shown in FIG. 1 is operated as follows for making a recording in which both the voice commentary and the trip tone are recorded on a single track.

By virtue of the interconnections as above described, the microphone 14 is connected by its wire 12 and plug 13 into jack 11 through the new device 10, jack 19 and wire 21 to the microphone input connection 20 of the monophonic magnetic tape recorder 18. Recorder 18 is set by the devices normally associated with the recorder for its recording mode of operation. The user speaks into microphone 14 until it is desired to effect a slide change. At this point the SPDT momentary push-button 25 on the front panel is depressed. As hereinafter more fully described this disconnects the microphone and substitutes a 60 Herz signal derived from projector 30 to be applied to the recording machine in place of the microphone sound. Upon release of the push-button 25 to its normally closed position the voice or sound may then be continued on the recording until a subsequent slide change is called for by the script. This is repeated until completion of the recording. The projector 30 will be tripped each time the momentary push-button 25 is depressed in addition to the application of the 60 Herz signal onto the magnetic tape recording, as explained below.

For playing back the recording, the output (external speaker) jack 17 of the recorder 18 is connected via cable and plug 16 to the playback input jack 15 of the new device 10. The recorder 18 is set in its playback mode as is customary and as the recorder plays, the recorded commentary is heard from loudspeaker 22 behind screen 23 in the new device 10. On the occurrence of a trip tone no sound is heard from the loudspeaker and the projector is tripped to provide a slide change. The commentary then continues and a subsequent recorded trip tone trips the slide projector exactly as when recorded.

Figure 2:
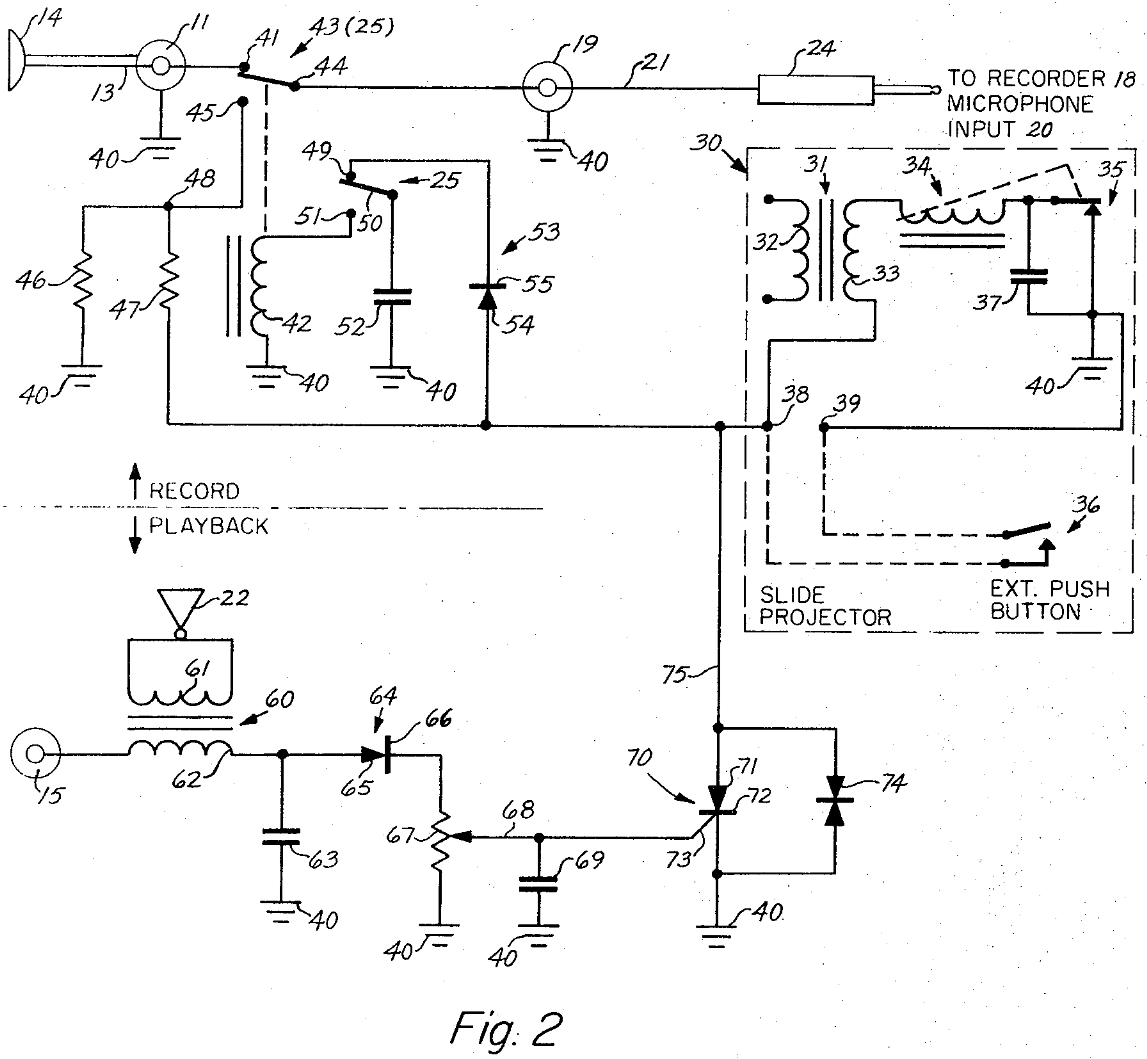

It is the novel circuit of FIG. 2 which makes the above-described simple operation possible. Referring now to FIG. 2, the components shown therein bear the same reference characters as do the identical components referred to in FIG. 1.

Within the dashed block 30 is drawn the circuit of significant parts of a typical slide projector trip mechanism. These include a transformer 31 which steps down the 60 Herz a-c line voltage to a lower potential in most instances. The primary 32 is connected to the line and the step down secondary 33 develops the lower potential. A solenoid trip coil 34 and its associated normally closed cutout switch 35 are operated whenever terminals 38 and 39 are shorted. The solenoid coil 34 is connected in series with one end of secondary 33 and its cutout switch 35 to the ground return or reference potential point 40. The other end of secondary 33 is connected to terminal 38. Terminal 39 is connected to ground as at 40. it can be seen, therefore, that whenever the terminals 38 and 39 are shorted the circuit to solenoid coil 34 is completed from transformer secondary 33, whereupon solenoid 34 is actuated to operate the slide change mechanism of the projector and to open the cutout switch 35, removing power from solenoid coil 34. Thus the solenoid 34 operates only momentarily. The capacitor 37 by-passes clicking transients from switch 35.

The system of the invention as shown in FIG. 1 at 10 provides a solid state switching device which closes the terminals 38, 39 in response to an audio signal on playback, and also while a recording is being made. In the record mode the audio signal is present on the same circuit as is used for playback trip control so that the tripping occurs in the same manner. See line 75 in FIG. 2.

Referring again to FIG. 2 and considering the record portion of the circuit in the upper part of FIG. 2, microphone 14 is connected via plug and jack 11, 13 through the normally closed terminals 41, 44 of a single-pole-double-throw (SPDT) contact assembly 43 of a relay 42 and through jack and plug 19, 24 to the microphone input 20 of the monophonic recorder 18. A lead from terminal 38 of the projector assembly 30 is connected to a voltage divider comprising resistors 46, 47 to the junction 48 of resistors 46, 47 is connected to the normally open terminal 45 of contact assembly 43.

The voltage divider return is connected to ground at 40. Also connected to the terminal 38 lead from projector 30 is the anode 54 of a rectifier diode 53. The cathode 55 of diode 53 is connected through the normally closed contacts 49, 50 of SPDT push-button 25 to a capacitor 52. Capacitor 52 is returned to ground at 40. It may be seen that so long as contacts 49, 50 are closed capacitor 52 is being charged by d-c through diode 53, which rectifies a-c from winding 33 of transformer 31.

The playback portion of the circuit of the new device is shown in the lower part of FIG. 2. Loudspeaker 22 is connected to the secondary 61 of an output transformer 60. The primary 62 of transformer 60 has one of its terminals connected to an input jack 15 which, as can be seen in FIG. 1, is connected by a cable and plug 16 to the external speaker output jack 17 of recorder 18. The other terminal of primary 62 is connected to the anode 65 of a diode 64 and to one terminal of a capacitor 63 which may be non-polarized. The cathode 66 of diode 64 is connected to one terminal of a potentiometer 67. The other terminal of potentiometer 67 is connected to ground at 40. The variable arm 68 of potentiometer 67 is connected to the gate 73 of a silicon controlled rectifier SCR 70. A by-pass capacitor 69 is connected between arm 68 and ground at 40. A bi-directional diode 74 is connected across SCR 70.

There are two modes of operation of the invention. A record mode and a playback mode. In both these modes all connections of cables 26, 12, 21 and 16, as described hereinabove, remain the same. Transition from record to playback modes is by use of the normal function selector switches of recorder 18. The functional modes of this invention as embodied in the assembly 10 in FIG. 1 and in the circuits of FIG. 2, hereinabove described, are as set forth below:

The operation of the record portion of the circuit shown in the upper half of FIG. 2 is as follows: Speaking into microphone 14 the voice signals are applied to the microphone input 20 of recorder 18 through contacts 41, 44, jack 19, lead 21, and plug 24. The magnetic tape recorder 18 is running in its record mode and the voice signals are recorded on the magnetic tape. At the time that it becomes necessary to place a slide change trip pulse on the recording, switch 25 is depressed, closing terminals 50 and 51 together. The charge on capacitor 52, previously mentioned, is now discharged through the coil of relay 42, causing the relay contacts 44 and 45 to close, thus opening the circuit from microphone 14 to the input of recorder 18, and replacing it with the circuit from the junction 48 voltage divide resistors 46, 47. Resistors 46, 47 are effectively between terminals 38, 39 of the projector mechanism in dashed box 30, so that a 60 Herz signal appears across these terminals and across resistors 46, 47. The values of resistors 46, 47 are selected so as not to short circuit terminals 38, 39. In proportion to the values of resistors 46, 47 a portion of the 60 Herz a-c signal is now applied via lead 21 to the microphone input 20 of recorder 18 as long as relay 42 is energized by the discharge of capacitor 52. The value of capacitor 52 is chosen so that in combination with the inductance of relay coil 42 a desired interval of relay closure is obtained. This closure interval must be somewhat longer than that necessary to actuate the trip mechanism of projector 30 but substantially shorter than one cycle of the trip mechanism, otherwise repeated tripping action will occur on playback and destroy synchronism. For a Kodak Carousel projector this interval is approximately .15 sec. (Kodak and Carousel are trademarks). Other projectors require trip signal durations from as little as 0.1 sec. to as much as 1.0 sec.

When capacitor 52 has discharged through relay coil 42 contacts 44, 45 are opened and contacts 41, 44 are closed removing the 60 Herz signal and reinstating the path from microphone to recorder so that further commentary may be made. The release of relay 42 occurs at the end of the LC discharge time of capacitor 52 through coil 42, no matter how long push-button 25 is held down beyond this discharge interval.

A further economy can be achieved by eliminating relay 42, capacitor 52 and diode 53. When this is done the SPDT relay control assembly 43 becomes instead SPDT push-button switch 25 as shown in FIG. 1. To illustrate this the reference character for switch 25 is repeated in parentheses (25) along side contact reference character 43. When this alternative configuration for switch (25) is used relay 42 and its charging capacitor 52 and diode 53 are not present.

Now when switch (25) is depressed microphone or sound signal source 14 is disconnected from the microphone input 19 and the 60 Herz signal appearing at junction 48 is applied through contacts 44, 45 to the microphone input terminal 19 instead. The resulting 60 Herz signal appearing on input 15 from recorder output 17 during this period causes SCR 70 to be gated, as previously described, to actuate the projector trip mechanism 30, as previously described. When this occurs terminals 38 and 39 are short-circuited cutting off the 60 Herz signal. The time interval involved before the shorting of terminals 38, 39 is no more than necessary to trip the projector so that the recorded tone signal will have a sufficient duration on playback to trip the projector in that time interval.

When the cord 16 and plug are connected between external speaker output 17 of recorder 18 and input 15 of the new device 10 of this invention any signals being generated for recording also appear at input 15 to actuate the tripping mechanism of SCR 70 as more fully described hereinafter so that when the 60 Herz signal is recorded it is also applied through transformer primary 62 to diode 64 in the playback portion of the invention, and is rectified to provide a d-c gating signal to the gate of SCR 70 to close terminals 38, 39 after a suitable short delay determined by the values of capacitors 63 and 69.

Thus, each time the push-button 25 is actuated, a 60 Herz signal is recorded on the tape and simultaneously the projector is tripped to change a slide.

For playback operation, the tape recording machine 18 is set in its playback mode and the now-recorded tape rewound to its beginning. As the tape is played voice and music signals, if present, appear across the primary 62 of transformer 60. The impedance of transformer primary 62 is chosen such that in combination with capacitor 63 it forms a low-pass filter such that no signals higher in frequency than some predetermined value — for example, 100 Herz will be transmitted to diode 64. Thus none of the voice or music signals will trip the slide projector. The voice signals, however, are transmitted from primary 62 to secondary 61 of transformer 60 to be heard from loudspeaker 22.

Loudspeaker 22 is of such character that low frequency signals (e.g., the 60 Herz trip signal) will not be heard since the speaker 22 cannot reproduce them. In addition, it should be obvious to those familiar with series LC circuits such as that formed by the primary coil 62 of transformer 60 and capacitor 63, when coupled to a secondary such as 61, that there is a tendency for the series LC circuit to act as an absorption trap for the frequency to which the coil 62 and capacitor 63 are resonant. Thus a low frequency tone would tend to be absorbed from secondary 61. The fact that loudspeaker 22 is ordinarily not responsive to the trip tone frequency combined with this absorption trap action deepens the reduction in audibility to the low frequency of the trip tone signal.

When a 60 Herz trip signal is present on the recording it appears at the input 15 of the device 10 passing across primary 62 of transformer 60 to diode 64 which rectifies the 60 Herz signal applying a unidirectional 60 Herz signal across potentiometer 67. Arm 68 is adjusted for an appropriate level to provide a suitable gating signal level for SCR 70. Capacitor 69 is a smoothing filter for the rectified signal appearing at arm 68. When SCR 70 is gated it effectively short circuits forward trip terminals 38, 39 of the projector 30 to initiate a slide change by actuating the slide change mechanism via the solenoid 34 in projector 30.

There has been described above a novel, inexpensive sound and slide synchronizing and programming system which can be connected to an inexpensive monophonic magnetic tape recording machine wherein a low-frequency slide-tripping signal is derived from the slide-projector mechanism, to be recorded on the tape on a common track with the voice commentary describing the slides. The mechanism includes a manually actuated push-button trip signal initiating means which actuates a self-timing relay to disconnect the commentary sound input during the recording and substitute therefor the timed trip tone to initiate a slide change. Alternatively the normal delay in operation of the slide projector closure switch mechanism can be used for trip signal duration timing.

Upon playing back the recorded commentary signals and trip tone signals the latter are separated from the former by a novel use of transformer windings and a capacitor to form a low-pass filter for the trip tone and effectively a high-pass filter for the voice signals.

What is claimed as new is:

1. In combination with a monophonic magnetic tape recording machine which has at least an audio input circuit and an external loudspeaker output circuit, and with a slide projector which has at least an electrically actuated forward advance circuit, the advance circuit having thereacross a low-voltage alternating current, a microphone, an advance trip closure circuit, a programming mechanism connectable between the audio input circuit of the tape recording machine in its recording mode and the forward advance circuit of the slide projector, said mechanism including manually operable momentary switch means connected to said audio input circuit, said microphone and said forward advance circuit for selectively applying said microphone to said input circuit in the normally closed position of said switch and applying said low voltage alternating current to said audio input circuit in the momentary closed position thereof;

said programming mechanism including also signal separating means connectable to said external loudspeaker output circuit in the playback mode of said magnetic tape recording machine to be responsive to the signals recorded on a magnetic tape in said recording mode to make audible only those signals recorded from said microphone and to apply only said low voltage alternating current signal to said advance trip closure circuit, whereby slide change and commentary sound are presented in synchronism from the recorded sound and said low voltage alternating current signals.

2. A mechanism for applying voice or other sound signals and slide projector tripping signals from a source of such projector tripping signals in a slide projector connected to the mechanism synchronously and selectively to the single track of a monophonic magnetic tape recording medium in a monophonic recording machine, said mechanism comprising:

a signal actuated switch means connected to the slide projector tripping signal source;

a manually operable switching means connected to an external source of sound signals, to a source of tripping signals derived from the slide projector, and to a recording machine for applying the sound or tripping signals selectively to a magnetic tape recording medium in a recording mode of said machine;

a loudspeaker; and a signal separating means connected to said loudspeaker, to said signal actuated switch means and to said recording machine and being responsive to the sound signals and the tripping signals on the recording medium in a playback mode of the recording machine for applying said tripping signals to said signal actuated siwtch means and said sound signals to said loudspeaker;

whereby slides may be changed in synchronism with the recorded sound signals such as an associated voice commentary and sound effects.

3. In the mechanism defined in claim 2 the signal separating means including:

a transformer having a primary and secondary winding, the primary winding being connected between the recording machine and the signal actuated switch means;

said loudspeaker being connected to said secondary winding; and a capacitor being connected from said connection of said primary winding with said signal actuated switch means to a point of reference potential for by-passing any sound signals to prevent their being applied to said signal actuated switch, thereby permitting only trip signals to be applied to said signal actuated switch.

4. In the mechanism defined in claim 2 said manually operable switch having a normally closed position for applying signals from said external source of sound signals to said recording machine and a momentary position in which said sound signals are disconnected from said recording machine and said derived tripping signals are applied to said recording machine in place of the sound signals.

5. For use with an automatically trippable slide projector, having at least a trip connection thereon, and a monophonic magnetic tape recording and playback machine, having an input circuit operable in its recording mode and at least an output circuit operable in its playback mode, a unitary device for tripping the slide projector in response to trip signals which have been recorded on a common track of the magnetic tape along with commentary and other sound signals, the unitary device comprising:

a manually operable switching means connected to the input circuit of the magnetic tape recording and playback machine in its recording mode, to a microphone and to the trip connection circuit of the slide projector for applying selectively a trip signal from the trip connection circuit or sound signals from said microphone to said input circuit of said recording and playback machine to be recorded on a common track of a magnetic tape on said machine;

a loudspeaker; and an automatic switching and sound transfer circuit connected to the output circuit of said magnetic tape recording and playback machine in its playback mode, to said loudspeaker and to said trip connection circuit of said slide projector for tripping the slide projector in response to said recorded trip signals and for applying said recorded sound signals to said loudspeaker, whereby accompanying sound, commentary and slides are presented in synchronism automatically.

6. In the mechanism defined in claim 5 said sound transfer circuit including:

an output transformer, having a primary and secondary, said primary being connected from said recording machine output circuit to said automatic switching circuit, said secondary being connected to said loudspeaker; and a capacitor being connected from the junction of said primary with said automatic switching circuit to a point of reference potential thereby forming with said primary a low-pass filter to permit only said trip signals to be applied to said automatic switching circuit, said sound signals being applied to said loudspeaker, and by-passed by said capacitor.

7. In the mechanism defined in claim 5, said automatic switching circuit including:

a silicon controlled rectifier having a pair of terminal connections connected to said trip connection circuit and a gate electrode; and a diode connected between said transfer circuit and said gate for rectifying said recorded trip signal and for applying said rectified signal as a gate signal to actuate said silicon controlled rectifier and thereby to trip said projector.

8. In the mechanism defined in claim 5, said manually operable switching means having a normally closed position whereby said microphone is connected to said input circuit of said recording machine and a momentary position in which said microphone is disconnected and said trip connection circuit is connected to said input circuit in its place.

9. In the mechanism defined in claim 8, voltage dividing means connected across said trip conenection circuit and having a divisional junction connected to said switching means for applying a selected portion of the voltage at said trip connection circuit to said input circuit of said recording machine in said momentary position of said manually operable switching means.

* * * * *